US011431715B2

United States Patent
Tummala et al.

(10) Patent No.: US 11,431,715 B2
(45) Date of Patent: Aug. 30, 2022

(54) NON-DISRUPTIVE LOGIN THROTTLING IN FIBRE CHANNEL NETWORKS

(71) Applicant: Cisco Technology, Inc., San Jose, CA (US)

(72) Inventors: Venu Gopal Tummala, Bengaluru (IN); Sunil John Varghese, Bangalore (IN); Pramod Menon, Bangalore (IN)

(73) Assignee: CISCO TECHNOLOGY, INC., San Jose, CA (US)

( * ) Notice: Subject to any disclaimer, the term of this patent is extended or adjusted under 35 U.S.C. 154(b) by 488 days.

(21) Appl. No.: 16/529,261

(22) Filed: Aug. 1, 2019

(65) Prior Publication Data

US 2021/0037017 A1 Feb. 4, 2021

(51) Int. Cl.
*H04L 29/06* (2006.01)
*H04L 9/40* (2022.01)
*H04L 49/356* (2022.01)
*H04L 67/1097* (2022.01)
*H04B 10/25* (2013.01)
*H04L 45/02* (2022.01)
*H04L 49/25* (2022.01)

(52) U.S. Cl.
CPC .......... *H04L 63/101* (2013.01); *H04B 10/25* (2013.01); *H04L 45/02* (2013.01); *H04L 49/25* (2013.01); *H04L 49/357* (2013.01); *H04L 63/10* (2013.01); *H04L 67/1097* (2013.01)

(58) Field of Classification Search
None
See application file for complete search history.

(56) References Cited

U.S. PATENT DOCUMENTS 9,699,027 B2 7/2017 Bharadwaj et al.
2001/0039590 A1* 11/2001 Furukawa ......... H04L 29/12018
709/250

(Continued)

FOREIGN PATENT DOCUMENTS

EP 2966818 A1 * 1/2016 ......... H04L 61/6022

OTHER PUBLICATIONS

"Fibre Channel Functional Overview", downloaded Aug. 1, 2019, http://www.sanog.org/resources/sanog8/sanog8-san-functional-overview-asimkhan.pdf, 47 pages.

(Continued)

*Primary Examiner* — William J. Goodchild
(74) *Attorney, Agent, or Firm* — Edell, Shapiro & Finnan, LLC (57) ABSTRACT

A method includes receiving a FLOGI message sent by a device seeking to log on to a network, wherein the device is in a same zone as reachable devices already logged into the network; in response to the FLOGI message, sending to the device a FC_ID, receiving from the device a query, including the FC_ID, for a list of devices with which the device can communicate, in response to the query, sending to the device an empty list of reachable devices with which the device can communicate within the same zone; after sending the empty list, programming, at least, an access control list (ACL) including information about the device; and after the ACL is programmed, triggering a RSCN message to be sent to the device to cause the device to, for the first time, obtain information about the reachable devices.

20 Claims, 3 Drawing Sheets

(56) References Cited

U.S. PATENT DOCUMENTS

| | | | |
|---|---|---|---|
| 2008/0114961 A1* | 5/2008 | Ramaswamy | G06F 3/0659 |
| | | | 711/170 |
| 2009/0219827 A1* | 9/2009 | Chen | H04L 49/357 |
| | | | 370/252 |
| 2012/0236721 A1 | 9/2012 | Dang et al. | |
| 2018/0063004 A1 | 3/2018 | Uppunda et al. | |

OTHER PUBLICATIONS

Cisco, "Design a Reliable and Highly Available Fibre Channel SAN White Paper", Document ID:1487867880349182, https://www.cisco.com/c/en/us/products/collateral/storage-networking/mds-9700-series-multilayer-directors/white-paper-c11-738426.html, Feb. 23, 2017, 52 pages.

Cisco, "Cisco MDS 9000 Series Release Notes, Release 8.4(1)", Jun. 30, 2019, https://www.cisco.com/c/en/US/td/docs/switches/datacenter/mds9000/sw/8_x/release_notes/mds_nxos_rn_8_4_1.html, 32 pages.

Jon Tate et al., "IBM SAN Survival Guide", International Technical Support Organization, IBM SAN Survival Guide, Aug. 2003, 4. http://www.redbooks.ibm.com/redbooks/pdfs/sg246143.pdf, 662 pages.

* cited by examiner

NON-DISRUPTIVE LOGIN THROTTLING IN FIBRE CHANNEL NETWORKS

TECHNICAL FIELD

The present disclosure relates to efficiently managing device login in a Fibre Channel network.

BACKGROUND

In a Fibre Channel network, nodes might spend 99% of their time sending and receiving frames, and network switches, for the most part, avail themselves of forwarding the frames to their respective destination nodes. However, many preparatory tasks must be performed by the network before it is ready to conduct normal frame exchanges. For example, fabric switches must initialize inter switch links (ISLs) between themselves and establish a structured addressing scheme along with an accompanying routing protocol. When zoning is configured, switches must also merge their respective zone databases and agree on a common active zone set. Similarly, end nodes or end devices must initialize the ports that connect them to the network in order to establish the connection topology. These tasks share the common objective of establishing steady-state operating parameters between a given end device and a switch. As the number of switches and end devices increases, it becomes increasingly more difficult to timely perform all of the necessary initializations, especially if multiple switches or end devices attempt to initialize in the network at substantially the same time.

DESCRIPTION OF EXAMPLE EMBODIMENTS

Overview

In one embodiment, a method is provided and includes receiving a fabric login (FLOGI) message sent by a device seeking to log on to a network, wherein the device seeking to log on to the network is in a same zone as reachable devices already logged into the network; in response to the FLOGI message, sending to the device seeking to log on to the network a Fibre Channel ID (FC_ID), receiving from the device seeking to log on to the network a query, including the FC_ID, for a list of devices with which the device seeking to log on to the network can communicate, in response to the query, sending to the device seeking to log on to the network an empty list of reachable devices with which the device seeking to log on can communicate within the same zone; after sending the empty list, programming, at least, an access control list (ACL) including information about the device seeking to log on to the network; and after the ACL is programmed, triggering a Registered State Change Notification (RSCN) message to be sent to the device seeking to log on to the network to cause the device seeking to log on to the network to, for the first time, obtain information about the reachable devices In another embodiment, an apparatus is provided. The apparatus includes an interface unit configured to enable network communications; a memory; and one or more processors coupled to the interface unit and the memory, and configured to: receive a fabric login (FLOGI) message sent by a device seeking to log on to a network, wherein the device seeking to log on to the network is in a same zone as reachable devices already logged into the network; in response to the FLOGI message, send to the device seeking to log on to the network a Fibre Channel ID (FC_ID), receive from the device seeking to log on to the network a query, including the FC_ID, for a list of devices with which the device seeking to log on to the network can communicate; in response to the query, send to the device seeking to log on to the network an empty list of reachable devices with which the device seeking to log on can communicate within the same zone; after sending the empty list, program, at least, an access control list (ACL) including information about the device seeking to log on to the network; and after the ACL is programmed, trigger a Registered State Change Notification (RSCN) message to be sent to the device seeking to log on to the network to cause the device seeking to log on to the network to, for the first time, obtain information about the reachable devices.

EXAMPLE EMBODIMENTS

In a Fibre Channel network, sometimes operating as a storage area network (SAN), end devices (or simply "devices") dynamically learn about other devices with which they can communicate by logging into a switch/fabric. Specifically, devices log in to a switch/fabric using a fabric login (FLOGI) or a fabric discovery (FDISC) message and a corresponding Link Service Accept (LS_ACC) message is expected in response. At a minimum, the LS_ACC response includes a dynamically assigned Fibre Channel ID (FC_ID) that is used by the device as its logical address.

However, before such a LS_ACC response can be issued, several back end hardware (HW) and software (SW) tables are programmed to keep track of the newly-logging in device. Examples of tables that might be programmed when a device logs in include a routing table, a forwarding table, and an access control list (ACL). In addition, a back end system or a switch, might manage issuance of a Registered State Change Notification (RSCN), and operate a Name Server and Zone server, all of which might be employed as part of a given device login process, and many of which interact with one other, or are dependent on one another. Typically, all of these table programming, interaction or synchronization are completed before a switch responds to the logging in device with a LS_ACC, including the FC_ID for the device.

Some Fibre Channel implementations may impose strict timing restrictions on SAN switches that can cause scaling challenges. For example, it is not uncommon that a Fibre Channel implementation might impose, e.g., a two second window within which to respond to a newly-logging in end device. If the switch does not respond in time, some devices might not attempt to log in again. Therefore, to avoid a scenario in which devices fail to join the network, a (SAN) switch should be able to complete programming of the various HW and SW tables, and other operations associated with device login, within the two second window. However, when a large number of end devices try to simultaneously log in to a given switch, the two second programming and response time window may not be able to be met.

Some switches address this scaling challenge via a concept called "port pacing". Port pacing is designed to pace the number of mode F (fabric) ports that come up simultaneously so that ports are brought up in a phased manner. However, such a port pacing approach does not take into account the possibility of there being multiple virtual machines (VMs) behind a single port, or multiple servers behind a single port using an N-Port Virtualization (NPV) switch.

The embodiments described herein take a different approach, which also happens to solve the problematic VM and NPV port pacing scenarios mentioned above. The approach helps end devices to come online (without experiencing timeouts or rejection from a switch) and to enable the FLOGI mechanism to break free from a tight software/hardware programming timing window.

Figure 1:
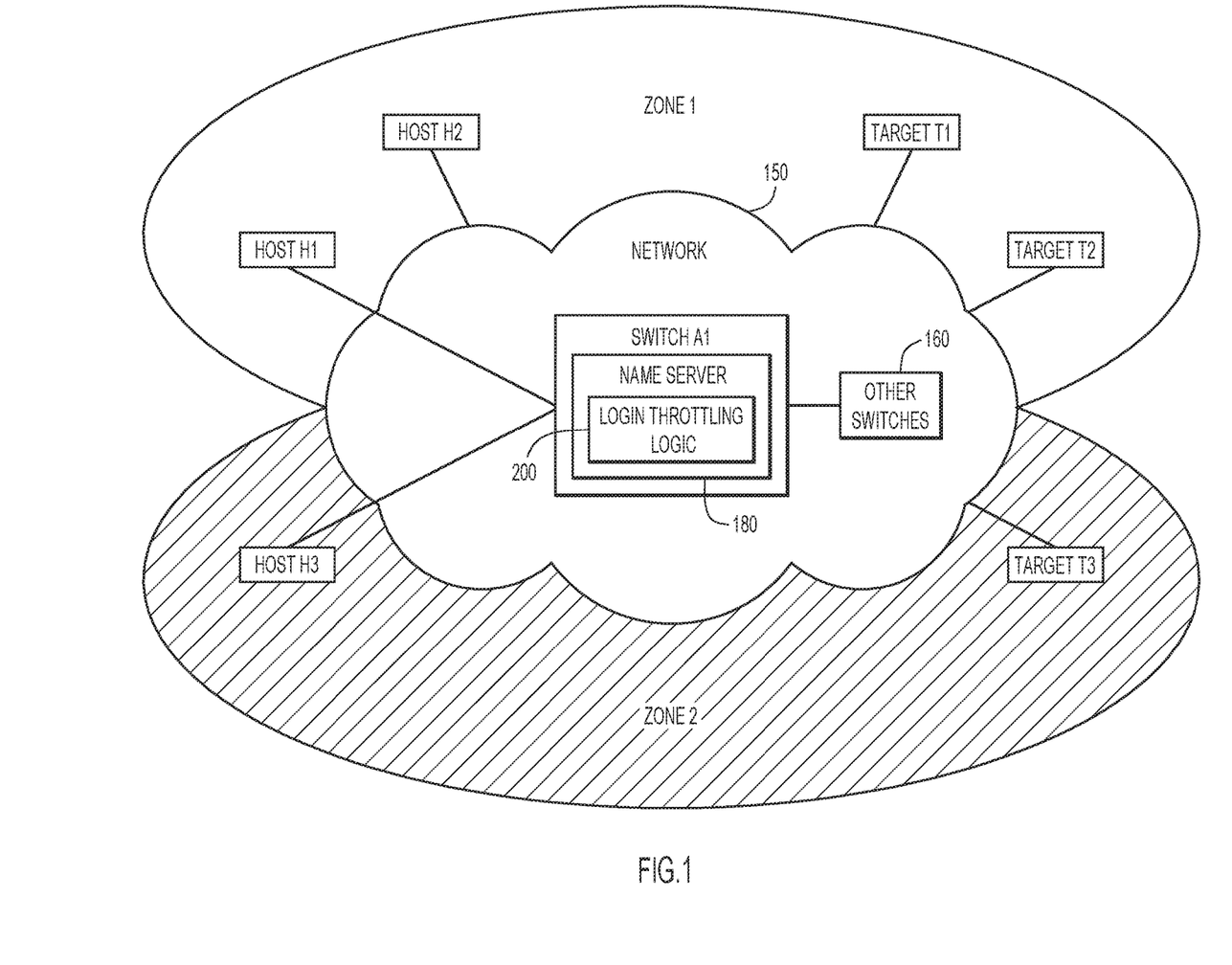
FIG. 1 shows a network topology in which login throttling logic may be deployed according to an example embodiment.

FIG. 1 shows a network topology in which login throttling logic may be deployed, according to an example embodiment. As shown, a switch A1 is part of a network 150 including other switches 160. Network 150 may be a SAN with multiple hosts (end devices) storing data to, and retrieving data from, multiple targets (also end devices).

Once a device (e.g., Host H1) logs in to switch A1 with a FLOGI message, Host H1 will register its attributes with a Name server 180 (which is shown as being part of switch A1, but could also be separately deployed), and then will query the Name server 180 about other (reachable) devices (hosts and targets) with which Host H1 can communicate, e.g., perhaps in a given zone. Conventionally, the Name server 180 will provide a (reachable) device list to the device logging in (Host H1, in this case). Using this list, Host H1 would then query the Name server 180 again for further details about each of the listed (reachable) devices, and may, upon receiving such details, thereafter start communicating with the reachable devices.

In contrast to the conventional approach, in the approach of the described embodiments, and executed by login throttling logic 200, the Name server 180 (or login throttling logic 200 executing thereon, or in coordination therewith) provides an "empty" list of (reachable) devices to the device logging in. It is noted that details regarding the device seeking to login (Host H1, in this case) are provided in the response. As such, the list is not "completely" empty in that sense. However, the list is empty with respect to other reachable devices, e.g., devices that might be in the same zone. Since Host H1 does not receive details about any other (reachable) device, Host H1 will not send any additional queries to the Name server 180 and will not, therefore, generate additional fabric traffic. This means that, at that time, no additional control or data traffic is generated, and no drops or timeouts may be experienced. This gives the fabric ample time to program and synchronize HW and SW tables employed to manage the fabric in connection with Host H1 logging in.

As part of FLOGI handling, login throttling logic 200 allocates a FC_ID and programs default well-known address (WKA) entries. In an embodiment, switches can even allocate FC_IDs and program WKAs in advance. This will still keep the fabric secure. As part of the FLOGI process, the immediate need is to just bind this pre-allocated FC_ID. As a result, switches can process more FLOGI/FDISCs.

More specifically, after a device (e.g., Host H1) receives a FLOGI_ACCEPT message with an FC_ID, the device will likely send a query (e.g., Get all the FC_IDs matching FC4-TYPES (GID_FT), or one of any number of other queries) to the name server 180 (or a management server). This is akin to Host H1 asking for all FC_IDs matching the FC4-types. In accordance with the embodiments described herein, instead of providing a list of all such devices, an empty list (except for information about Host H1 itself) is returned to Host H1.

Devices have many attributes (e.g., port-name, symbolic name, IP-address) which are device specific. When it comes to programming entries, there are 3 entry types (control traffic, device to device routing (data traffic), and security entry (ACL)), and all 3 types rely only on an FC_ID to be programmed.

Control traffic: These programming entries will allow a device to send frames to the switch applications (e.g., name server, management server, etc.). This is referred to as control traffic, which can be programmed upfront even before a FLOGI request is received. For example, it is possible to pre-allocate ten FC_IDs and program all the entries for those ten FC_IDs to let the control traffic reach the switch. As soon as the device (Host H1) attempts login through FLOGI, the Name server 180 will associate or bind the pre-allocated FC_ID with attributes received in the FLOGI frame (e.g., FC_ID 0x220100 is associated to device wwn 20:00:01:22:15:42:21:00).

At this point, the device (e.g., Host H1) can talk to switch A1, but still has yet to discover other devices. Host H1 may then send a PLOGI (port login) to switch A1. A PLOGI allows Host H1 to talk to the Name server 180 (or management server or other servers residing in the switch A1). Subsequent to PLOGI, there are several queries Host H1 can send to name server 180 (or a management server) to discover other devices to which Host H1 can communicate. In accordance with the embodiments described herein, in response to such queries, an empty list is provided to Host H1. That list, however, may contain Host H1's own FC_ID, if the query's attribute matches with its own attributes. Because Host H1 is not made aware of other devices, Host H1 will remain relatively "quiet" on the network, at least during this period.

Device to device routing (data traffic): These programming entries are routing and forwarding entries which will allow devices to send data to each other. There could be a number of switches between the source and destination. Routing and forwarding programming entries provide mappings to enable frames to reach their destination.

Security entry (ACL): Rogue devices can pump unwanted traffic into the fabric/switch. These programming entries prevent that. Single or multiple entries (depending on the number of devices it can communicate with) are programmed for, e.g., Host H1.

In accordance with an embodiment, at least the control traffic programming entries need not be completed within an imposed two-second window, and this is achieved by not sending to, e.g., Host H1, a listing of devices with which Host H1 can communicate.

Referring still to FIG. 1, as other switches 160 in the network 150 complete their relevant updating of HW and SW tables in connection with Host H1 logging in, the Name servers (not shown) of each of the other switches 160 send Name server 180 (i.e., the switch where Host H1 logged in) an Update Programming Done (UPD_PROG_DONE) notification. The Name server 180 may then, in response to receiving the UPD_PROG_DONE notification, send another notification (RSCN_SEND) to all the switches. The RSCN_SEND notification causes the Name servers associated with the other switches 160 across the fabric to send an RSCN to devices zoned with Host H1, resulting in each such device learning about the newly logged in Host H1. That same RSCN also is received by newly logged Host H1. Once each device, including Host H1, receives the RSCN, each will query the Name server 180 again and they will learn about all devices in the zone and can start communication.

Reference is again made to FIG. 1 for a further discussion of the foregoing. As shown, Host H1 is connected to switch A1. Zone 1 suggests that Host H1 is allowed to communicate with Host H2, Target T1 and Target T2. In conventional implementations, Host H1 sends a FLOGI and receives an FC_ID, which is assigned only after all the relevant SW and HW tables are programmed. That is, conventionally, Host H1 details are synchronized to the rest of the fabric (i.e., Target T1, Target T2, and Host H2 also will want to learn about Host H1, since they are all part of Zone 1), and the SW and HW tables in their corresponding switches are programmed, all before the FC_ID is sent.

That is, conventionally, Host H1 learns from Name server 180 (or other management server) about Host H2, Target T1 and Target T2. Host H2, Target T1 and Target T2 receive a notification (RSCN) and each, in turn, queries the Name server 180 to learn about Host H1. At this point, all four devices (Host H1, Host H2, Target T1, and Target T2) start sending multiple queries to the Name server 180 and also start communicating with each other. Notably, frames may be dropped if the HW and SW tables are not programmed in time across the path. This is where the load of the switch increases exponentially. If this is a scale setup and multiple devices are logging in, some may receive rejects, some may timeout. Some will re-try which again creates additional traffic and some devices may not be able to login at all, at least in timely fashion.

In the instant embodiments, however, when Host H1 queries the Name server 180 immediately after login, the Name server 180 (i.e., login throttling logic 200) limits or does not share the details of Host H2, Target T1 and Target T2. Without this information being given to Host H1, other devices remain idle with respect to Host H1. Once all the HW and SW tables are programmed, login throttling logic 200 causes a RSCN to be sent to Host H1, and to Host H2, Target T1, and Target T2. In an embodiment, a common trigger may cause the RSCN to go to all four devices. They can each then, in turn, start their communication. Host H3 and Target T3 are not involved in this process, as they are part of Zone 2.

Figure 2:
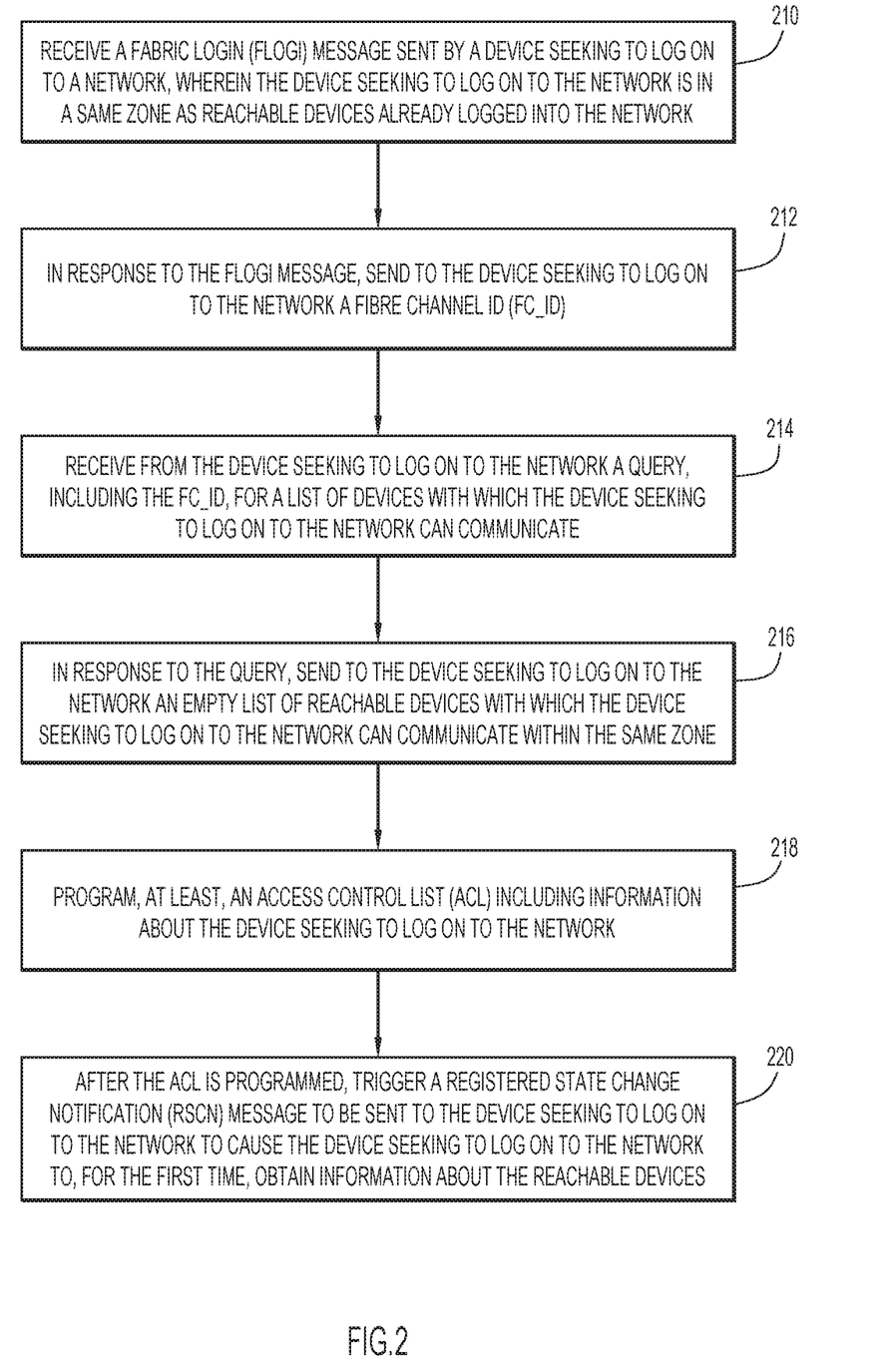
FIG. 2 is a flowchart illustrating a series of operations performed by login throttling logic according to an example embodiment.

FIG. 2 is a flowchart illustrating a series of operations performed by login throttling logic (or "logic") 200 according to an example embodiment. At 210, logic 200, receives a fabric login (FLOGI) message sent by a device seeking to log on to a network, wherein the device seeking to log on to the network is in a same zone as reachable devices already logged into the network. At 212, logic 200, in response to the FLOGI, sends to the device seeking to log on to the network a Fibre Channel ID (FC_ID). At 214, logic 200 receives from the device seeking to log on to the network a query, including the FC_ID, for a list of devices with which the device seeking to log on to the network can communicate. At 216, logic 200, in response to the query, sends to the device seeking to log on to the network an empty list of reachable devices with which the device seeking to log on to the network can communicate within the same zone. At 218, logic 200 programs, at least, an access control list (ACL) including information about the device seeking to log on to the network. At 220, logic 200, after the ACL is programmed, triggers a Registered State Change Notification (RSCN) message to be sent to the device seeking to log on to the network to cause the device seeking to log on to the network to (for the first time) obtain information about the reachable devices.

Figure 3:
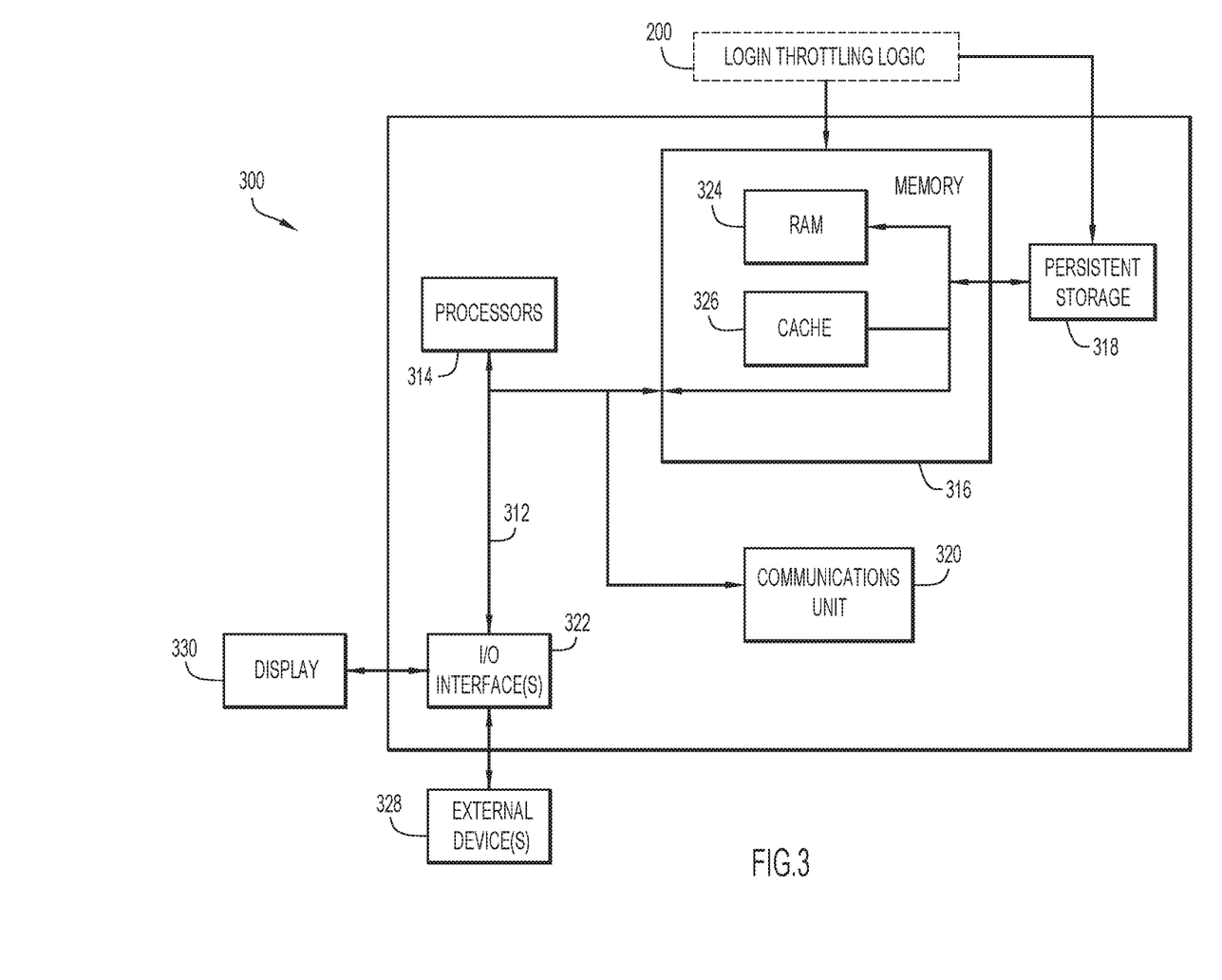
FIG. 3 depicts a device or apparatus (e.g., a switch) that might host and execute login throttling logic according to an example embodiment.

FIG. 3 depicts a device 300 (e.g., a switch A1) on which login throttling logic 200 may be deployed in accordance with an example embodiment. It should be appreciated that FIG. 3 provides only an illustration of one embodiment and does not imply any limitations with regard to the environments in which different embodiments may be implemented. Many modifications to the depicted environment may be made.

As depicted, the device 300 includes a bus 312, which provides communications between computer processor(s) 314, memory 316, persistent storage 318, communications unit 320, and input/output (I/O) interface(s) 322. Bus 312 can be implemented with any architecture designed for passing data and/or control information between processors (such as microprocessors, communications and network processors, etc.), system memory, peripheral devices, and any other hardware components within a system. For example, bus 312 can be implemented with one or more buses.

Memory 316 and persistent storage 318 are computer readable storage media. In the depicted embodiment, memory 316 includes random access memory (RAM) 324 and cache memory 326. In general, memory 316 can include any suitable volatile or non-volatile computer readable storage media.

One or more programs (e.g., login throttling logic 200) may be stored in persistent storage 318 for execution by one or more of the respective computer processors 314 via one or more memories of memory 316. The persistent storage 318 may be a magnetic hard disk drive, a solid state hard drive, a semiconductor storage device, read-only memory (ROM), erasable programmable read-only memory (EPROM), flash memory, or any other computer readable storage media that is capable of storing program instructions or digital information. For example, the one or more programs may include software instructions that, when executed by the one or more processors 314, cause the computing device 300 to perform the operations described herein.

The media used by persistent storage 318 may also be removable. For example, a removable hard drive may be used for persistent storage 318. Other examples include optical and magnetic disks, thumb drives, and smart cards that are inserted into a drive for transfer onto another computer readable storage medium that is also part of persistent storage 318.

Communications unit 320, in these examples, provides for communications with other data processing systems or devices. In these examples, communications unit 320 includes one or more network interface cards. Communications unit 320 may provide communications through the use of either or both physical and wireless communications links.

I/O interface(s) 322 allows for input and output of data with other devices that may be connected to computer device 300. For example, I/O interface(s) 322 may provide a connection to external devices 328 such as a keyboard, keypad, a touch screen, and/or some other suitable input device. External devices 328 can also include portable computer readable storage media such as database systems, thumb drives, portable optical or magnetic disks, and memory cards.

Software and data used to practice embodiments can be stored on such portable computer readable storage media and can be loaded onto persistent storage 318 via I/O interface(s) 322. I/O interface(s) 322 may also connect to a display 330. Display 330 provides a mechanism to display data to a user and may be, for example, a computer monitor.

The programs described herein are identified based upon the application for which they are implemented in a specific embodiment. However, it should be appreciated that any particular program nomenclature herein is used merely for convenience, and thus the embodiments should not be limited to use solely in any specific application identified and/or implied by such nomenclature.

Data relating to operations described herein may be stored within any conventional or other data structures (e.g., files, arrays, lists, stacks, queues, records, etc.) and may be stored in any desired storage unit (e.g., database, data or other repositories, queue, etc.). The data transmitted between entities may include any desired format and arrangement, and may include any quantity of any types of fields of any size to store the data. The definition and data model for any datasets may indicate the overall structure in any desired fashion (e.g., computer-related languages, graphical representation, listing, etc.).

The present embodiments may employ any number of any type of user interface (e.g., Graphical User Interface (GUI), command-line, prompt, etc.) for obtaining or providing information (e.g., data relating to scraping network sites), where the interface may include any information arranged in any fashion. The interface may include any number of any types of input or actuation mechanisms (e.g., buttons, icons, fields, boxes, links, etc.) disposed at any locations to enter/display information and initiate desired actions via any suitable input devices (e.g., mouse, keyboard, etc.). The interface screens may include any suitable actuators (e.g., links, tabs, etc.) to navigate between the screens in any fashion.

The environment of the present embodiments may include any number of computer or other processing systems (e.g., client or end-user systems, server systems, etc.) and databases or other repositories arranged in any desired fashion, where the present embodiments may be applied to any desired type of computing environment (e.g., cloud computing, client-server, network computing, mainframe, stand-alone systems, etc.). The computer or other processing systems employed by the present embodiments may be implemented by any number of any personal or other type of computer or processing system (e.g., desktop, laptop, PDA, mobile devices, etc.), and may include any commercially available operating system and any combination of commercially available and custom software (e.g., machine learning software, etc.). These systems may include any types of monitors and input devices (e.g., keyboard, mouse, voice recognition, etc.) to enter and/or view information.

It is to be understood that the software of the present embodiments may be implemented in any desired computer language and could be developed by one of ordinary skill in the computer arts based on the functional descriptions contained in the specification and flow charts illustrated in the drawings. Further, any references herein of software performing various functions generally refer to computer systems or processors performing those functions under software control. The computer systems of the present embodiments may alternatively be implemented by any type of hardware and/or other processing circuitry.

The various functions of the computer or other processing systems may be distributed in any manner among any number of software and/or hardware modules or units, processing or computer systems and/or circuitry, where the computer or processing systems may be disposed locally or remotely of each other and communicate via any suitable communications medium (e.g., LAN, WAN, Intranet, Internet, hardwire, modem connection, wireless, etc.). For example, the functions of the present embodiments may be distributed in any manner among the various end-user/client and server systems, and/or any other intermediary processing devices. The software and/or algorithms described above and illustrated in the flow charts may be modified in any manner that accomplishes the functions described herein. In addition, the functions in the flow charts or description may be performed in any order that accomplishes a desired operation.

The software of the present embodiments may be available on a non-transitory computer useable medium (e.g., magnetic or optical mediums, magneto-optic mediums, floppy diskettes, CD-ROM, DVD, memory devices, etc.) of a stationary or portable program product apparatus or device for use with stand-alone systems or systems connected by a network or other communications medium.

The communication network may be implemented by any number of any type of communications network (e.g., LAN, WAN, Internet, Intranet, VPN, etc.). The computer or other processing systems of the present embodiments may include any conventional or other communications devices to communicate over the network via any conventional or other protocols. The computer or other processing systems may utilize any type of connection (e.g., wired, wireless, etc.) for access to the network. Local communication media may be implemented by any suitable communication media (e.g., local area network (LAN), hardwire, wireless link, Intranet, etc.).

The system may employ any number of any conventional or other databases, data stores or storage structures (e.g., files, databases, data structures, data or other repositories, etc.) to store information (e.g., data relating to contact center interaction routing). The database system may be implemented by any number of any conventional or other databases, data stores or storage structures (e.g., files, databases, data structures, data or other repositories, etc.) to store information (e.g., data relating to contact center interaction routing). The database system may be included within or coupled to the server and/or client systems. The database systems and/or storage structures may be remote from or local to the computer or other processing systems, and may store any desired data (e.g., data relating to contact center interaction routing).

The embodiments presented may be in various forms, such as a system, a method, and/or a computer program product at any possible technical detail level of integration. The computer program product may include a computer readable storage medium (or media) having computer readable program instructions thereon for causing a processor to carry out aspects of presented herein.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present embodiments may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Python, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects presented herein.

Aspects of the present embodiments are described herein with reference to flowchart illustrations and/or block diagrams of methods, apparatus (systems), and computer program products according to the embodiments. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

In summary, in one form, a method is provided. The method includes receiving a fabric login (FLOGI) message sent by a device seeking to log on to a network, wherein the device seeking to log on to the network is in a same zone as reachable devices already logged into the network; in response to the FLOGI message, sending to the device seeking to log on to the network a Fibre Channel ID (FC_ID); receiving from the device seeking to log on to the network a query, including the FC_ID, for a list of devices with which the device seeking to log on to the network can communicate; in response to the query, sending to the device seeking to log on to the network an empty list of reachable devices with which the device seeking to log on can communicate within the same zone; after sending the empty list, programming, at least, an access control list (ACL) including information about the device seeking to log on to the network; and after the ACL is programmed, triggering a Registered State Change Notification (RSCN) message to be sent to the device seeking to log on to the network to cause the device seeking to log on to the network to obtain information about the reachable devices.

In an embodiment, the method is executed on a storage area network (SAN) switch.

In one embodiment, the method is executed by a name server of a storage area network (SAN).

The method may still further include triggering the RSCN message to be sent after receiving an indication from a name server associated with one of the reachable devices that programming of the one of the reachable devices regarding the device seeking to log on to the network is complete.

The method may also include triggering the RSCN message to be sent to a switch into which the one of the reachable devices logged in.

The method may also include triggering RSCN message to be sent simultaneously to the switches into which the reachable devices logged in.

The method may still also include sending to the device seeking to log on to the network the FC_ID within two seconds of receiving the FLOGI message.

The method may also include allocating the FC_ID in advance.

In another form, a device may also be provided in accordance with an embodiment. The device may include an interface unit configured to enable network communications; a memory; and one or more processors coupled to the interface unit and the memory, and configured to: receive a fabric login (FLOGI) message sent by a device seeking to log on to a network, wherein the device seeking to log on to the network is in a same zone as reachable devices already logged into the network; in response to the FLOGI message, send to the device seeking to log on to the network a Fibre Channel ID (FC_ID); receive from the device seeking to log on to the network a query, including the FC_ID, for a list of devices with which the device seeking to log on to the network can communicate; in response to the query, send to the device seeking to log on to the network an empty list of reachable devices with which the device seeking to log on can communicate within the same zone; after sending the empty list, program, at least, an access control list (ACL) including information about the device seeking to log on to the network; and after the ACL is programmed, trigger a Registered State Change Notification (RSCN) message to be sent to the device seeking to log on to the network to cause the device seeking to log on to the network to obtain information about the reachable devices.

In an embodiment, the apparatus comprises a storage area network (SAN) switch.

In an embodiment, the apparatus comprises a name server of a storage area network (SAN).

In an embodiment the one or more processors may be configured to trigger the RSCN message to be sent after receiving an indication from a name server associated with one of the reachable devices that programming of the one of the reachable devices regarding the device seeking to log on to the network is complete.

In an embodiment the one or more processors may be configured to trigger the RSCN message to be sent to a switch into which the one of the reachable devices logged in.

In an embodiment the one or more processors may be configured to trigger the RSCN message to be sent simultaneously to the switches into which the reachable devices logged in.

In an embodiment the one or more processors may be configured to send to the device seeking to log on to the network the FC_ID within two seconds of receiving the FLOGI message.

In an embodiment the one or more processors may be configured to allocate the FC_ID in advance.

In still another form, a non-transitory computer readable storage media is provided that is encoded with instructions that, when executed by a processor, cause the processor to receive a fabric login (FLOGI) message sent by a device seeking to log on to a network, wherein the device seeking to log on to the network is in a same zone as reachable devices already logged into the network; in response to the FLOGI message, send to the device seeking to log on to the network a Fibre Channel ID (FC_ID); receive from the device seeking to log on to the network a query, including the FC_ID, for a list of devices with which the device seeking to log on to the network can communicate; in response to the query, send to the device seeking to log on to the network an empty list of reachable devices with which the device seeking to log on can communicate within the same zone; after sending the empty list, program, at least, an access control list (ACL) including information about the device seeking to log on to the network; and after the ACL is programmed, trigger a Registered State Change Notification (RSCN) message to be sent to the device seeking to log on to the network to cause the device seeking to log on to the network to obtain information about the reachable devices.

In an embodiment, the storage media encoded with the instructions is part of a storage area network (SAN) switch.

In an embodiment, the storage media encoded with the instructions is part of a name server of a storage area network (SAN).

The instructions may further include instructions that, when executed by a processor, cause the processor to trigger the RSCN message to be sent after receiving an indication from a name server associated with one of the reachable devices that programming of the one of the reachable devices regarding the device seeking to log on to the network is complete.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The above description is intended by way of example only. Various modifications and structural changes may be made therein without departing from the scope of the concepts described herein and within the scope and range of equivalents of the claims.

What is claimed is:

1. A method comprising:
    receiving a fabric login (FLOGI) message sent by a device seeking to log on to a network, wherein the device seeking to log on to the network is in a same zone as reachable devices already logged into the network;
    in response to the FLOGI message, sending to the device seeking to log on to the network a Fibre Channel ID (FC_ID);
    receiving from the device seeking to log on to the network a query, including the FC_ID, for a list of devices with which the device seeking to log on to the network can communicate;
    in response to the query, sending to the device seeking to log on to the network an empty list of reachable devices with which the device seeking to log on can communicate within the same zone;
    after sending the empty list, programming, at least, an access control list (ACL) including information about the device seeking to log on to the network; and after the ACL is programmed, triggering a Registered State Change Notification (RSCN) message to be sent to the device seeking to log on to the network to cause the device seeking to log on to the network to obtain information about the reachable devices.

2. The method of claim 1, wherein the method is executed on a storage area network (SAN) switch.

3. The method of claim 1, wherein the method is executed by a name server of a storage area network (SAN).

4. The method of claim 1, further comprising triggering the RSCN message to be sent after receiving an indication from a name server associated with one of the reachable devices that programming of the one of the reachable devices regarding the device seeking to log on to the network is complete.

5. The method of claim 4, further comprising triggering the RSCN message to be sent to a switch into which the one of the reachable devices logged in.

6. The method of claim 5, further comprising triggering the RSCN message to be sent simultaneously to the switches into which the reachable devices logged in.

7. The method of claim 1, further comprising sending to the device seeking to log on to the network the FC_ID within two seconds of receiving the FLOGI message.

8. The method of claim 1, further comprising allocating the FC_ID in advance.

9. An apparatus comprising:
an interface unit configured to enable network communications;
a memory; and
one or more processors coupled to the interface unit and the memory, and configured to:
receive a fabric login (FLOGI) message sent by a device seeking to log on to a network, wherein the device seeking to log on to the network is in a same zone as reachable devices already logged into the network;
in response to the FLOGI message, send to the device seeking to log on to the network a Fibre Channel ID (FC_ID);
receive from the device seeking to log on to the network a query, including the FC_ID, for a list of devices with which the device seeking to log on to the network can communicate;
in response to the query, send to the device seeking to log on to the network an empty list of reachable devices with which the device seeking to log on can communicate within the same zone;
after sending the empty list, program, at least, an access control list (ACL) including information about the device seeking to log on to the network; and
after the ACL is programmed, trigger a Registered State Change Notification (RSCN) message to be sent to the device seeking to log on to the network to cause the device seeking to log on to the network to obtain information about the reachable devices.

10. The apparatus of claim 9, wherein the apparatus comprises a storage area network (SAN) switch.

11. The apparatus of claim 9, wherein the apparatus comprises a name server of a storage area network (SAN).

12. The apparatus of claim 9, wherein the one or more processors are configured to trigger the RSCN message to be sent after receiving an indication from a name server associated with one of the reachable devices that programming of the one of the reachable devices regarding the device seeking to log on to the network is complete.

13. The apparatus of claim 12, wherein the one or more processors are configured to trigger the RSCN message to be sent to a switch into which the one of the reachable devices logged in.

14. The apparatus of claim 13, wherein the one or more processors are configured to trigger the RSCN message to be sent simultaneously to the switches into which the reachable devices logged in.

15. The apparatus of claim 9, wherein the one or more processors are configured to send to the device seeking to log on to the network the FC_ID within two seconds of receiving the FLOGI message.

16. The apparatus of claim 9, wherein the one or more processors are configured to allocate the FC_ID in advance.

17. A non-transitory computer readable storage media encoded with instructions that, when executed by a processor, cause the processor to:
receive a fabric login (FLOGI) message sent by a device seeking to log on to a network, wherein the device seeking to log on to the network is in a same zone as reachable devices already logged into the network;
in response to the FLOGI message, send to the device seeking to log on to the network a Fibre Channel ID (FC_ID);
receive from the device seeking to log on to the network a query, including the FC_ID, for a list of devices with which the device seeking to log on to the network can communicate;
in response to the query, send to the device seeking to log on to the network an empty list of reachable devices with which the device seeking to log on can communicate within the same zone;
after sending the empty list, program, at least, an access control list (ACL) including information about the device seeking to log on to the network; and
after the ACL is programmed, trigger a Registered State Change Notification (RSCN) message to be sent to the device seeking to log on to the network to cause the device seeking to log on to the network to obtain information about the reachable devices.

18. The non-transitory computer readable storage media of claim 17, wherein the storage media encoded with the instructions is part of a storage area network (SAN) switch.

19. The non-transitory computer readable storage media of claim 17, wherein the storage media encoded with the instructions is part of a name server of a storage area network (SAN).

20. The non-transitory computer readable storage media of claim 17, wherein the instructions, when executed, are configured to trigger the RSCN message to be sent after receiving an indication from a name server associated with one of the reachable devices that programming of the one of the reachable devices regarding the device seeking to log on to the network is complete.

* * * * *